United States Patent
Beskales et al.

(10) Patent No.: US 10,803,105 B1
(45) Date of Patent: *Oct. 13, 2020

(54) COMPUTER-IMPLEMENTED METHOD FOR PERFORMING HIERARCHICAL CLASSIFICATION

(71) Applicant: Tamr, Inc., Cambridge, MA (US)

(72) Inventors: George Beskales, Waltham, MA (US); John Kraemer, Somerville, MA (US); Ihab F. Ilyas, Waterloo (CA); Liam Cleary, Dublin (IE); Paul Roome, Oakland, CA (US)

(73) Assignee: Tamr, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/704,046

(22) Filed: Dec. 5, 2019

Related U.S. Application Data

(63) Continuation of application No. 15/836,188, filed on Dec. 8, 2017.

(60) Provisional application No. 62/540,804, filed on Aug. 3, 2017.

(51) Int. Cl.
  *G06F 16/00* (2019.01)
  *G06F 16/35* (2019.01)
  *G06K 9/62* (2006.01)
  *G06N 20/00* (2019.01)

(52) U.S. Cl.
  CPC ......... *G06F 16/353* (2019.01); *G06K 9/6282* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 6,301,579 B1 * | 10/2001 | Becker | G06F 16/283 |
| 8,332,394 B2 | 12/2012 | Fan et al. | |
| 8,463,750 B2 | 6/2013 | Kazi et al. | |
| 8,612,373 B2 * | 12/2013 | Chidlovskii | G06F 16/35 |
| | | | 706/20 |
| 8,719,267 B2 | 5/2014 | Chen et al. | |
| 9,081,854 B2 | 7/2015 | Ulanov et al. | |
| 9,324,022 B2 | 4/2016 | Williams, Jr. et al. | |
| 10,339,468 B1 * | 7/2019 | Johnston | G06N 20/00 |
| 10,678,816 B2 * | 6/2020 | Peng | G06F 16/22 |
| 2008/0069437 A1 * | 3/2008 | Baker | G06K 9/6256 |
| | | | 382/159 |
| 2016/0078361 A1 | 3/2016 | Brueckner et al. | |
| 2016/0117587 A1 | 4/2016 | Yan et al. | |

(Continued)

OTHER PUBLICATIONS

Bilenko et al., "Adaptive Blocking: Learning to Scale Up Record Linkage," Proceedings of the Sixth IEEE International Conference on Data Mining, pp. 87-96 (2006).

(Continued)

*Primary Examiner* — Bai D Vu
(74) *Attorney, Agent, or Firm* — Panitch Schwarze Belisario & Nadel LLP

(57) ABSTRACT

Given a number of records and a number of target classes to which these records belong to, a (weakly) supervised machine learning classification method leverages known possibly dirty classification rules, efficiently and accurately learns a classification model from training data, and applies the learned model to the data records to predict their classes.

1 Claim, 6 Drawing Sheets

(56) References Cited

U.S. PATENT DOCUMENTS

2019/0043193 A1* 2/2019 Odaibo .............. G06K 9/00597
2019/0378044 A1* 12/2019 Jeffery .................... G06N 5/04

OTHER PUBLICATIONS

Sarawagi et al., "Interactive Deduplication using Active Learning," Proceedings of the ACM SIGKDD, pp. 269-278 (2002).
Settles, B., "Active Learning Literature Survey," Computer Sciences Technical Report 1648, University of Wisconsin-Madison, 67 pages (2010).
Silla et al., "A Survey of Hierarchical Classification Across Different Application Domains," Data Min. Knowl. Disc., vol. 22, No. 31, pp. 1-41 (2011).

* cited by examiner

|         | Classifier A | Classifier B | Classifier C | Classifier D |
|---------|--------------|--------------|--------------|--------------|
| Class 1 | 0.2          | 0.01         | 1.1          | 6            |
| Class 2 | 14.0         | 0.97         | 6.9          | 14473        |
| Class 3 | 1.2          | 0.07         | 7.5          | 1            |
| Class 4 | 0.1          | 0.00         | 0.3          | 4            |
| Class 5 | 0.4          | 0.01         | 0.1          | 15           |
| Class 6 | 0.1          | 0.00         | 0.0          | 0            |

Figure 4

| | Classifier A | Classifier B | Classifier C | Classifier D | Combined |
|---|---|---|---|---|---|
| Class 1 | 0.0125 | 0.009433 | 0.069182 | 0.000413 | 0.020013 |
| Class 2 | 0.875 | 0.915094 | 0.433962 | 0.998206 | 0.810950 |
| Class 3 | 0.075 | 0.066037 | 0.471698 | 0.000069 | 0.153188 |
| Class 4 | 0.00625 | 0.0 | 0.018867 | 0.000275 | 0.005485 |
| Class 5 | 0.025 | 0.009433 | 0.006289 | 0.001034 | 0.009014 |
| Class 6 | 0.00625 | 0.0 | 0.0 | 0.0 | 0.001347 |

Figure 5

| | Entropy (bits) |
|---|---|
| Classifier A | 0.75243 |
| Classifier B | 0.50298 |
| Classifier C | 1.45465 |
| Classifier D | 0.02171 |
| Combined | 0.61551 |

Figure 6

COMPUTER-IMPLEMENTED METHOD FOR PERFORMING HIERARCHICAL CLASSIFICATION

CROSS-REFERENCE TO RELATED APPLICATIONS

This utility patent application is a continuation of copending U.S. application Ser. No. 15/836,188 filed Dec. 8, 2017, which is incorporated by reference herein.

This utility patent application claims priority from U.S. provisional patent application Ser. No. 62/540,804 filed Aug. 3, 2017, titled "System for Scalable Hierarchical Classification Using Blocking and Active Learning Methods", naming inventors George Beskales, John Kraemer, Ihab F. Ilyas, Liam Cleary, and Paul Roome.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2017 Tamr.

BACKGROUND

Field of Technology

This disclosure is related to computer system solutions for data integration, data quality, and data transformation, and more particularly to rapidly classifying records from multiple large scale sources.

Background

Accurately classifying records (such as products into product categories) is a hard problem, which grows further complex as scale increases. Active learning to train computer systems for such classification has been limited to flat classification models.

U.S. Patents

U.S. Pat. No. 9,324,022 ("Classifying data with deep learning neural records incrementally refined through expert input", Williams, Jr. et al., 2016 Apr. 26) discloses, in the Abstract, "Embodiments are directed towards classifying data using machine learning that may be incrementally refined based on expert input. Data provided to a deep learning model that may be trained based on a plurality of classifiers and sets of training data and/or testing data. If the number of classification errors exceeds a defined threshold classifiers may be modified based on data corresponding to observed classification errors. A fast learning model may be trained based on the modified classifiers, the data, and the data corresponding to the observed classification errors. And, another confidence value may be generated and associated with the classification of the data by the fast learning model. Report information may be generated based on a comparison result of the confidence value associated with the fast learning model and the confidence value associated with the deep learning model." This teaches classification using deep learning with expert input for retraining if error thresholds are exceeded.

U.S. Pat. No. 9,081,854 ("Multilabel classification by a hierarchy", Ulanov et al., 2015 Jul. 14) discloses, in the Abstract, "A technique of extracting hierarchies for multi-label classification. The technique can process a plurality of labels related to a plurality of documents, using a clustering process, to cluster the labels into plurality of clusterings representing a plurality of classes. The technique classifies the documents and predicts a plurality of performance characteristics, respectively, for the plurality of clusterings. The technique selects at least one of the clusterings using information from the performance characteristics and adds the selected clustering into a resulting hierarchy." This teaches clustering documents for the purpose of classifying within a hierarchy.

Non-Patent Literature Documents

"A Survey of Hierarchical Classification Across Different Application Domains", Carlos N. Silla Jr. and Alex A. Freitas, Data Mining and Knowledge Discovery, Vol. 22 Iss 1-2, January 2011, pp. 31-72. The focus of work mentioned in this survey is improving the classification accuracy by leveraging the hierarchical nature of classes.

"Active Learning Literature Survey", Burr Settles, Computer Sciences Technical Report 1648, University of Wisconsin-Madison, Jan. 26, 2010. The work cited in this survey focuses on active learning in the context of flat classification only (i.e., when all classes are at one level).

"Interactive Deduplication using Active Learning", Sunita Sarawagi and Anuradha Bhamidipaty, SIGKDD 2002, pp. 269-278, Edmonton, Canada. Active learning in this work is applied in the context of duplicate detection, which is considered a flat classification exercise with two classes: "match" and "non-match".

"Adaptive Blocking: Learning to Scale Up Record Linkage", Mikhail Bilenko, Beena Kamath, and Raymond J. Mooney, ICDM 2006, December 2006, pp. 87-96, Hong Kong. This work applies DNF blocking techniques to obtain candidate matches in the context of duplicate elimination.

None of the above provides a system with (1) clustering/deduplicating records, (2) generating candidate associations between unlabeled records and classes, (3) learning a hierarchical classification model, (4) predicting hierarchical classification of unlabeled records, and (4) identifying high-impact records for targeted active learning. What is needed, therefore, is a system that overcomes the above-mentioned limitations and that includes the features enumerated above.

BRIEF SUMMARY

Given a number of records and a number of target classes to which these records belong to, a (weakly) supervised machine learning classification method leverages known possibly dirty classification rules, efficiently and accurately learns a classification model from training data, and applies the learned model to the data records to predict their classes.

Features and Advantages

1. The classes are arranged in a hierarchy or a directed acyclic graph (DAG).

2. The system scales well with the number of classes (hundreds of thousands) and the number of records (millions).

3. The system provides highly accurate class predictions.

4. The system optimizes the degree of human interaction that is needed to train a highly accurate model.

5. The system recognizes the sparsity and long-tail effect of training labeled data, and provide the optimal level of classification for each new record 6. The system uses weak supervision, by leveraging existing rules to generate initial (possibly weighted) training data, and hence allow for absorbing already existing classification software in the enterprise in a principled way.

BRIEF DESCRIPTION OF THE DRAWINGS

In the drawings, closely related figures and items have the same number but different alphabetic suffixes. Processes, states, statuses, and databases are named for their respective functions.

FIG. 4 is an example of predictions introduced by an ensemble of classifiers.

FIG. 5 is an example of combining classification probabilities from multiple classifiers.

FIG. 6 is an example of computing entropy and combined entropy for multiple classifications.

DETAILED DESCRIPTION, INCLUDING THE PREFERRED EMBODIMENT

Figure 1:
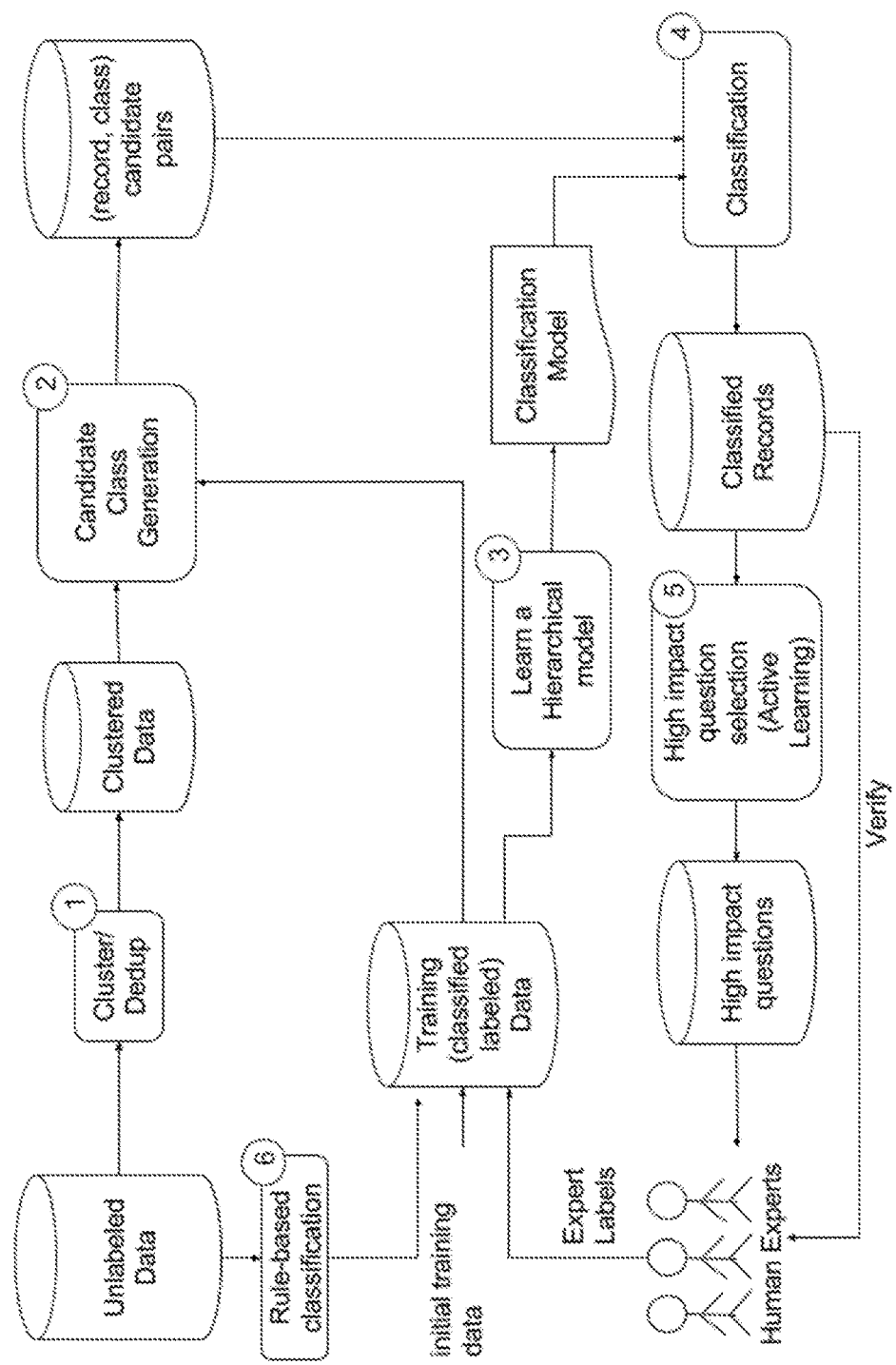
FIG. 1 is the system data flow chart.

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current invention. Where there is a conflict, the following definitions apply.

Class: a label to be associated with records.

Training data: a set of records with known class associations.

Classifier: a method to predict classes of records, given training data.

Classification model: the output of classifier training process, which can then be used for predicting classes of other unclassified records.

Rule: a method to assign classes to records.

Hierarchical classification: predicting classes of records where classes are arranged into a hierarchy.

Human experts: humans with sufficient expertise to assign classes to records.

Active learning: the process of interacting with users to collect training data for the purpose of training a classifier.

High impact question: the data records that are suggested to be labeled by the active learning process.

Classification candidate: a pair of a record and a class that can possible be linked together.

Operation

Given a set of records (e.g., products) and a number of classes (e.g., product categories), the disclosed system predicts the class each record belongs to in an efficient and accurate way. The number of records is assumed to be on the order of millions, and the number of classes is on the order of hundreds of thousands.

The classes can be either a flat set, a hierarchy, or a directed acyclic graph. In the latter two cases, parent-child edges represent an IS-A relationship. For example, the top-level classes could be "electronics", "hardware", and "vehicles". At the second level, classes "phones" and "laptops" may appear under category "electronics", while classes "bolts", "nuts" and "screws" may appear under "hardware".

An improved computer system for classifying data records may be any single or multiple processor machine, or multiple network connected machines, with data input and output capabilities. Input can be direct, such as through disk, keyboard, or mouse, or indirect, such as over a network through an application programming interface (API) or webpage driven interface. Output may similarly be direct, such as display on a connected screen, or indirect such as written to disk or database for later and/or remotely connected access. The computing system may also be a virtual computing environment operating on top of physical hardware, such as within cloud platform computing.

The computing system receives data records, including training data having known classification labels and unlabeled data. The data records can come from one or more sources, such as text files, databases, or other data repositories. Software operated on the computing system performs the modeling, learning, and classification detailed below. The software may be implemented as a single program, or as multiple programs performing specific separate tasks. In learning and verification involving human experts, a notification system may be used such as through a web-based interaction portal or command-line driven interaction, with notification via email, text message, or other electronic communication indicating need for human expert review and response. Alternatively, notification can be delivered to a single administrator or operator of the software, with records for human expert review in an output file or other data location.

Referring to FIG. 1, given a set of training data (i.e., records with known classes), a classification model is built 3 that predicts the class of unlabeled records, given the record fields. For example, a number of binary classifiers (e.g., logistic regression, support vector machine) are built such that each classifier can predict whether a record belongs to a certain class or not. Given an unlabeled record, running all classifiers and selecting the most probable class based on their outcome predicts 4 the most likely class of the record.

Naively applying the classification for each class against each record will result in highly accurate classification, however it is not efficient due to the need to evaluate thousands of classifiers in order to obtain the final class prediction. In order to speed up the classification process, similar records that are likely to get the same labels (e.g., duplicate records) are first consolidated 1 with respect to classification attributes. This reduces the number of records that need to be classified. Then, candidate class generation is performed 2 where each record is assigned to one or more candidate classes to which this record may belong. The candidate classes represent the starting point for obtaining the final classifications while heavily pruning the search space. Record membership with respect to the candidate classes (and possible neighbor classes) is verified by running the corresponding classifiers.

Once unlabeled records are classified, the records with the highest classification uncertainty are selected and sent to human experts for verification 5. Such records represent "high-impact training question" since they maximize the information gain from human experts. Once such records are labeled, they are added to the training data. This process continues until all record classifications have high confidence. The process of high-impact question selection and feeding new labels back to training is called "active learning".

1. Record Deduplication/Clustering

The goal of this step is detecting and consolidating records that are highly similar (and hence belonging to the same class). This allows reducing the time required to classify the data since only unique records are classified.

The methods used for deduplicating the records may range from exact matching to more sophisticated clustering algorithms. For example, it is possible to use locality sensitive hashing (e.g., min-hash) to efficiently get similar records. Then, a clustering algorithm (e.g., greedy agglomerative hierarchical clustering) is used for clustering similar record pairs. For each one of the resulting clusters, a representative record (a.k.a. centroid) is selected to be classified. Finally, such classification is propagated to the entire cluster.

2. Candidate Generation

The goal of the candidate generation step is to retrieve (record, class) candidates in an efficient way while maintaining high recall (i.e., true (record, class) associations) among the candidates. In the following, multiple implementations are introduced for candidate generation.

1. Binning unlabeled and labeled records
2. Co-cluster unlabeled records and labeled records
3. For each subset of classes, build a cheap classifier that can efficiently detect whether a record belongs to any of the classes or not.

Each implementation may be a software program executed on a computer processor, or module within a software program.

Candidate Generation Method

This method models the problem as a fuzzy record linkage exercise with the objective of mapping input records with all potential similar class representatives. The method takes two data sets: the first data set contains the input records and the second dataset contains representative records for all classes. Blocking and binning techniques are then applied (e.g., canopy blocking, prefix filtering blocking, DNF blocking) to efficiently bin input records with representative records. For any input record, the classes associated with the representative records that are in the same bin are declared as candidate classes for that input record.

Example Implementation of the Method:
Input:
Training Data in form of (labeled-record, class) pairs
Unlabeled records
Output:
Candidate (unlabeled-record, class) associations
Procedure:
1. Group labeled data by class, and aggregate records into a representative record. This can be done by, e.g., concatenating record attributes. The result will be (class, representative-record) pairs.
2. Learn a disjunctive normal form (DNF) formula in terms of attribute similarities between pairs of records such that (labeled-record, representative-record) satisfies the DNF formula if labeled-record belongs to the corresponding class.
3. Use the DNF formula to map each unlabeled-record and representative-record to a number of hash IDs such that similar records are mapped to the same hash ID (e.g., using min-hash).
4. For each (unlabeled-record, representative-record) that belongs to the same bin, output candidate pair (unlabeled-record, class) where the class is the label of the representative record.

Candidate Generation Method 2

This method clusters the union of labeled and unlabeled records. Each cluster containing at least one labeled record emits candidate pairs consisting of the Cartesian product of classes of labeled records and unlabeled records. One possible clustering algorithm that can be used in step 2 is nearest-neighbor clustering, where mutual k-NN are clustered together. Other clustering algorithms that could be applied include greedy agglomerative clustering and mixture models. The clustering algorithm should be tuned to be have high recall. That is, any two records that could possibly belong to the same class should be in the same cluster. That can be achieved by adjusting the cluster parameters (e.g., increase the distance cut-off threshold for greedy agglomerative clustering).

Example Implementation of the Method:
Input:
Training Data in form of (labeled-record, class) pairs
Unlabeled records
Output:
Candidate (unlabeled-record, class) associations
Procedure:
1. Union labeled and unlabeled records
2. Perform efficient clustering of the union of records. Record clusters are allowed to be overlapping.
3. For each cluster that contains at least one labeled record, output candidate pairs consisting of all records in the cluster and all classes of the labeled records.
4. For each cluster that does not contain any labeled records, output candidate pairs (unlabeled-record, root-class), for each unlabeled-record and each root in the class hierarchy.

Candidate Generation Method 3

This method groups classes that have similar distinctive features and creates a cheap classifier to detect records belonging to such group with high recall. Note that this approach does not rely on the hierarchy of the classes. In other words, even if the class hierarchy is flat, this method will still be able to perform well.

Example Implementation of the Method:
Input:
Training Data in form of (labeled-record, class) pairs
Unlabeled records
Output:
Candidate (unlabeled-record, class) associations
Procedure:
1. Cluster labeled records based on their features.
2. For each cluster, group the classes that are associated with the cluster members.
3. For each class group, train a binary classifier (e.g., logistic regression, SVM, decision tree), to detect with high recall whether a record could belong to any class in the group.
4. For each unlabeled record, run all group classifiers, and for each positive prediction, output (unlabeled-record, class) for each class in the group.

3. Learning Hierarchical Classification Model

Figure 2:
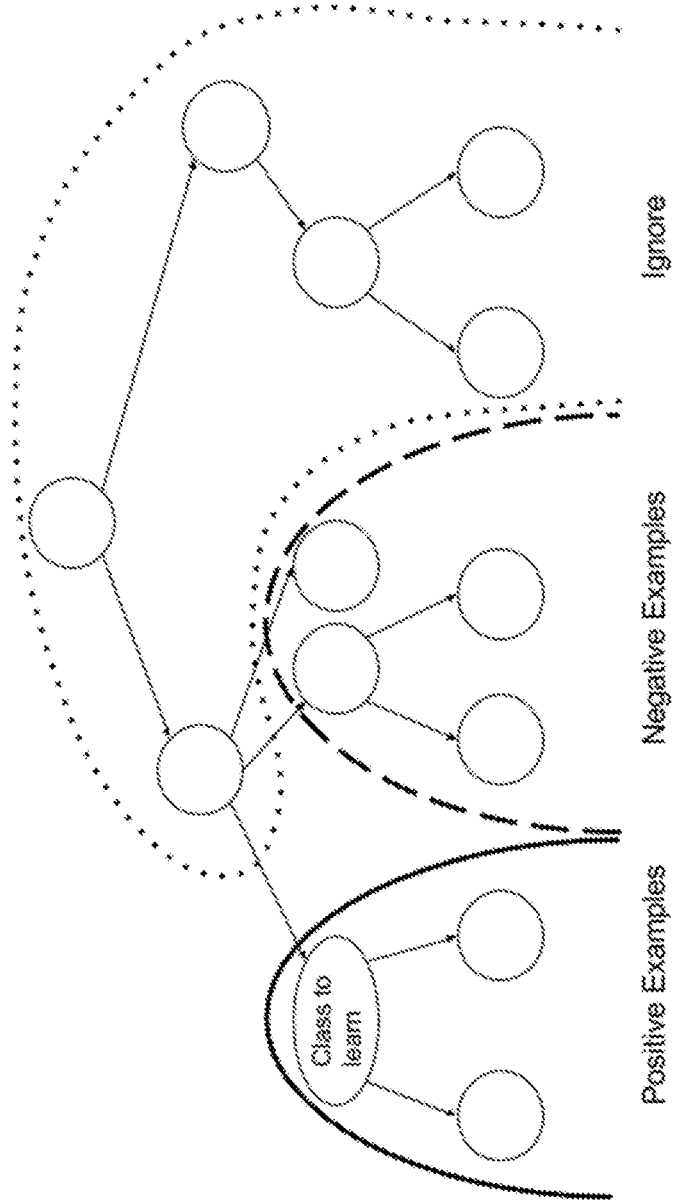
FIG. 2 is an example of positive and negative data points that are used for training a binary classifier.

A binary classifier is built for each class in the class hierarchy, with labeled records belonging to this class or any of its descendants are labeled as positive examples, and all records in the sibling classes and descendants of siblings are labeled as negative examples. All other records are ignored. This selection criterion is depicted in FIG. 2. Each classifier provides the conditional probability of a record belonging to the associated class, given that it belongs to the parent class. It is possible to have more inclusive negative examples for each class by including siblings with common least ancestor being more than one level above the class to be learned.

4. Predicting Hierarchical Classification

If a record R can possibly be a member of class C (i.e., based on the candidate generation process mentioned earlier), the system predicts whether R belongs to C or any of its descendants. If so, the system computes the most specific subclass in C that R can be positively determined to belong to. In the following, an approach to solve this problem is described.

The probability obtained by a classifier associated with class C is conditioned on the record belonging to the parent of C. Such probability is denoted as $Pr(R \in C | R \in parent(C))$. Of course, the conditional probability of a record belonging to the root, which contains all classes, is equal to 1. (Note that because classifiers are trained independently, the sum of conditional probabilities of belonging to classes with the same parent is not equal to 1, so the likelihoods must be normalized.)

Using the chain rule, marginal probability of a record R belonging to a class C is computed using the product of membership probabilities obtained by the classifier of C and the classifiers of all of its ancestors. That is, $$Pr(R \in C) = \prod_{C' \in \{C\} \cup ancestors(C)} Pr(R \in C' | R \in parent(c'))$$

It follows that as the classification becomes more specific, the membership probability monotonically decreases—it is not possible for the estimated probability for a subclass to exceed that of its superclass. If the estimated probability mass within one class is a high-entropy split between several alternatives, the ancestor class may be reported instead. This is achieved by defining a scoring function for each record and class pair (R, C) that combines the membership probability of record R with respect to class C and the specificity of C (e.g., the depth of C in the class hierarchy over the maximum depth of the hierarchy or the prior inverse log likelihood that any record will be in C):

$$score(R,C) = w \cdot Pr(R \in C) + (1-w) \cdot specificity(C)$$

where $w \in [0,1]$

Figure 3:
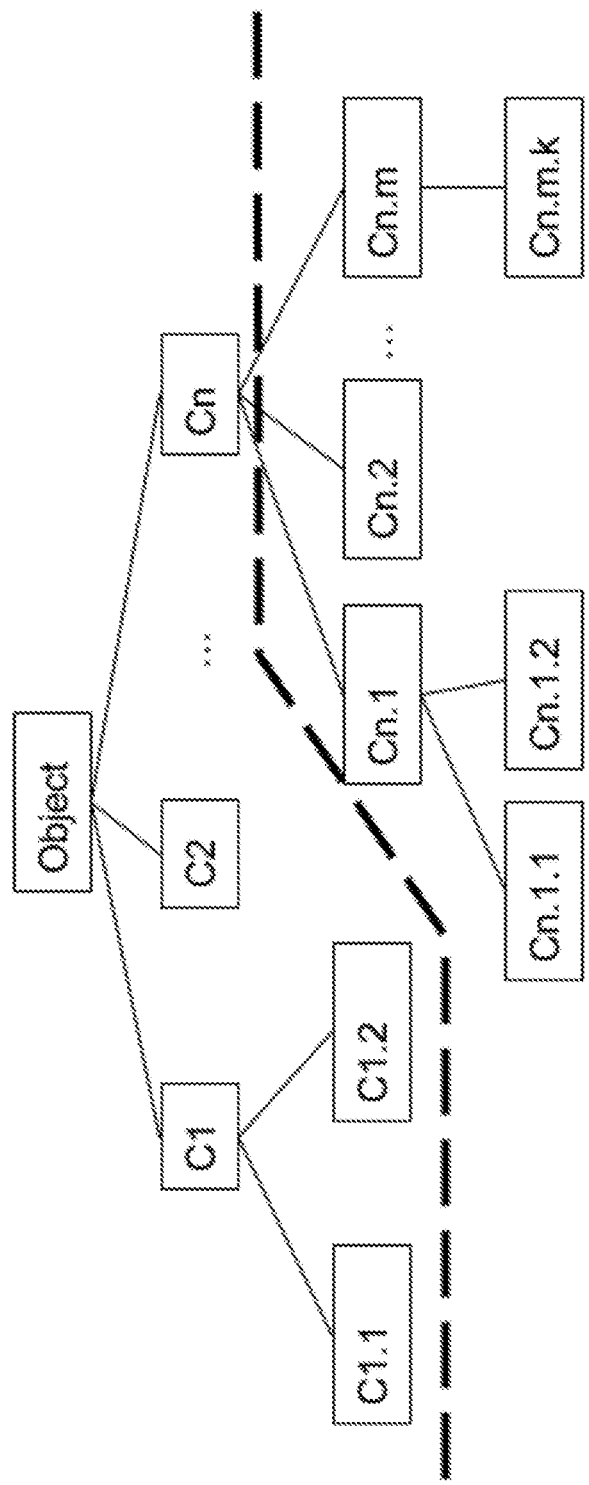
FIG. 3 is an example of hierarchical classification prediction using A* search.

The goal is to obtain the class with the top score for each record. This is achieved through an A*-search algorithm, where classes are considered in the order on their descendants score upper bound. The algorithm starts with the root class and iteratively expands the class with the highest score upper bound of all classes descending from this class. Class upper bounds are maintained using a priority queue. For example, and referring also to FIG. 3, classes above the dotted line represents the visited classes. As the search algorithm continues, it pushes such line by visiting more classes. The algorithm terminates when the exact score of the latest popped class is above the upper bound of all other classes in the queue.

In order to obtain an upper bound for a record and class pair (R, C), an upper bound is obtained for the probability of R belonging to C and an upper bound is obtained for specificity of C. Given that membership probability monotonically decreases with descent in the class hierarchy, it is possible to use $Pr(R \in C_p)$ to upper bound $Pr(R \in C)$ such that $C_p$ is an ancestor of C. Also, given that specificity of classes only depends on the class characteristics (e.g., depth and size) and not the individual records being classified, it is possible to precompute the maximum specificity of all classes descending from a certain class, which may be represented as upper(specificity(C)). It follows that the upper bound for all classes descending from C, denoted as upper(R,C), can be computed as follows:

$$upper(R,C) = w \cdot Pr(R \in C) + (1-w) \cdot upper(specificity(C))$$

5. Targeted Active Learning

In order to improve the accuracy of the current record blocker and the current classifiers, training data is expanded. It is expensive to ask human experts to label records, and thus it is important to select the most useful records to send to experts. One key is to avoid sending redundant records that do not affect the classifier. For example, records that are predicted to be in a certain class with high confidence will probably have many similar records in training data (with the same class). Thus, labeling more records that belong to the same class will not add new information to the existing training data.

The most confusing records with respect to the current classifiers are selected. One approach to quantify the record confusion is to count the number of conflicting predictions. A preferred approach is to compute the entropy for the class membership probability distribution, given all classifiers' outcomes. Since there are a number (k) of distinct classifiers for each candidate class, which generate scores independently of each other, the scores will not naturally constitute a well-formed probability distribution. Consequently, there are several possible approaches to computing the entropy of the predicted classifications. FIG. 6 shows an example set of generated scores from four classifiers among six candidate classes, which are used in the following description of how to generate well-formed distributions with a defined entropy of classification. As shown in FIG. 4, different classifiers might produce scores with very different distributional properties. These scores can be normalized into probability distributions as shown in FIG. 5.

The probability distributions are combined into a single distribution, optionally employing add-ε smoothing (as shown in column Combined in FIG. 5) using $$x_j = 1 - \prod_{i}^{k} (1 - p_{ij})^{1/k}$$

and re-normalizing $$p_j = \frac{x_j}{\sum_{i}^{k} x_i},$$

which allows computing the Shannon entropy of score values $$H(X) = \sum_{i}^{k} \log_2 p(x_i) \cdot p(x_i).$$

During question selection, another key is avoiding selecting outlier records (i.e., records are not similar to any other records). This is achieved by selecting high-impact questions through weighted sampling, where the probability of selecting a record is proportional to a static factor (e.g., 0.01) times the entropy of the distribution of predictions. This method has the effect of biasing the human expertise towards high-impact training questions which will provide more information gain to the model about the category of the classifiers being used, while winnowing out those in which the model has a higher degree of certainty about the subclass.

5.1 Targeted Active Learning:

The above approach aims primarily at faster convergence and targets the classifier(s) that need more training data or have more confusion/uncertainty. Often times these classifiers are not equally important in terms of business value, for example, it may be more important to have an accurate classifier for a certain part that is associated with a high cost or a high spending before another classifier that has lower impact on business. The questions in module 5 may be ranked to take into account these importance scores provided by a business owner.

6. Rule-Based Classification

Existing classification rules are incorporated into the training process by applying such rules to the unlabeled records and appending the resulting labeled records to the training data repository. In order to avoid imbalanced training data where the majority of the points are coming from rules versus other sources (e.g., human labeling and external training data), training data generated by rules is downsampled. Alternatively, smaller weights are assigned to such points. In case of conflicting labels among classification rules, or between rules and other training sources, the corresponding records are sent to human experts to select the correct label.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A computer-implemented method for performing hierarchical classification comprising:
   (a) inputting, into software running on one or more computer processors, training data records having known classification labels and unlabeled records;
   (b) building, by the software, a classification model from the training data records that is configured to predict a hierarchical class of an unlabeled record, the classification model including a plurality of binary classifiers, each binary classifier being configured to predict whether an unlabeled record belongs to a certain hierarchical class;
   (c) consolidating, by the software, the unlabeled records through deduplication or clustering;
   (d) identifying, by the software, a subset of the hierarchical classes as being candidate hierarchical classes for each of the unlabeled records;
   (e) predicting, by the software, hierarchical classifications for each record in the unlabeled records using the plurality of binary classifiers;
   (f) scoring, by the software, using a scoring function, each of the predicted hierarchical classifications of the unlabeled records;
   (g) obtaining, by the software, using a search algorithm, a top-scoring predicted hierarchical classification of each unlabeled record; and
   (h) outputting, by the software, the top-scoring predicted hierarchical classification as the predicted classification for each of the unlabeled records,
   wherein steps (e)-(h) are performed on the consolidated records, and
   wherein the hierarchical classifications for each record in the unlabeled records are predicted, by the software, using only the candidate hierarchical classes for each of the unlabeled records.

* * * * *